United States Patent [19]
Marshall et al.

[11] Patent Number: 5,406,898
[45] Date of Patent: Apr. 18, 1995

[54] REFORESTATION PROCEDURE

[75] Inventors: John G. Marshall, Toronto; Erwin B. Dumbroff, Waterloo, both of Canada

[73] Assignee: University of Waterloo, Waterloo, Canada

[21] Appl. No.: 46,577

[22] Filed: Apr. 14, 1993

[30] Foreign Application Priority Data

Apr. 14, 1992 [GB] United Kingdom ................ 9208228

[51] Int. Cl.$^6$ ............................................. A01G 23/02
[52] U.S. Cl. ................................... 111/200; 111/900; 144/335; 241/7; 241/9; 241/24
[58] Field of Search ............................ 47/9 P, 9 M, 9; 111/200, 900; 144/335; 56/126; 241/7, 9, 24, 101.7

[56] References Cited

U.S. PATENT DOCUMENTS

| 4,035,993 | 7/1977 | Bell et al. | 56/126 X |
| 4,291,810 | 11/1981 | Hansford | 111/200 X |
| 4,369,054 | 1/1983 | Shinholster, Jr. et al. | 47/9 X |
| 4,488,396 | 12/1984 | Fandrich | 56/130 X |
| 4,662,414 | 5/1987 | Fandrich | 144/335 |
| 5,222,563 | 6/1993 | Van Horlick | 172/111 |

Primary Examiner—David H. Corbin
Assistant Examiner—Christopher J. Novosad
Attorney, Agent, or Firm—Sim & McBurney

[57] ABSTRACT

Reforestation of cut forest regions is effected by broadcasting comminuted slash or cone-bearing roadside logging residue from delimbing of freshly-cut trees over the region from which the trees are cut. By comminuting the slash live seeds are released from cones contained in the slash and are returned to the forested area. In this way, an inexpensive reforestation procedure is provided and biodiversity is retained.

4 Claims, No Drawings

REFORESTATION PROCEDURE

FIELD OF INVENTION

The present invention relates to a novel reforestation procedure which avoids the current high cost procedures adopted for such purposes.

BACKGROUND TO THE INVENTION

Current reforestation procedures involve collection of cones, release of seeds from the cones, sowing and producing seedlings, which then are transported to the site of reforestation. This procedure is labor-intensive and expensive and seedling production capacity is well below that required to replant cut overs. In addition, the genetic diversity of the cut stand is lost and replaced by a foreign progeny.

Alternative methods of reforestation, such as aerial direct seeding, are not highly attractive options because of limitations in the amount of expensive purified seeds available, airplane distribution costs and the modest result obtained.

Low profit margins and the old, declining or senescing nature of many Canada's boreal forests makes large strip cuts or clear cuts an economically attractive alternative to selection cutting. This procedure is an extensive, highly automated process where trees are often mechanically felled, transported to roadside and delimbed. Workers and equipment are only transported to the cut site once. In contrast, present methods of reforestation are very expensive, labor intensive and require that planting crews and equipment return to the cut over after the harvest crews have left.

What is required is a low cost, highly extensive method for reforesting all cut overs using the workers and equipment on site during the harvest operation with little additional cost. We now have found an entirely unique way of achieving reforestation which conforms to this requirement. In this invention, inexpensive crude seed extracted from forest residues using a rapid mechanical process is employed for reforestation and a very high direct seeding germination density can be achieved.

SUMMARY OF INVENTION

In accordance with one aspect of the present invention, there is provided a method of effecting reforestation, which comprises extracting from forest residues a crude seed extract, and seeding a deforested area with the crude seed extract.

Another aspect of the present invention provides a method of effecting forest management, which comprises effecting a strip cut or clear cut of a mixed conifer forest in which trees are felled, transported to a delimbing site or full-tree chipping site and delimbed to form cone-bearing roadside logging debris; comminuting the logging debris to release live seeds from the cones; and broadcasting the comminuted logging debris over the area of the boreal forest in which the strip cut or clear cut was made.

GENERAL DESCRIPTION OF INVENTION

In the present invention, therefore, the slash or cone-bearing roadside logging debris from the tree delimbing procedure or a full-tree chipping procedure, including branches, needles and cones, is chipped, ground or otherwise comminuted sufficiently to release live seeds from the cones, which then germinate when distributed in the deforested area. A large number of seeds are released from the cones when such comminution is effected, for example, more than 2500 seeds/Kg of black spruce limbs and tops. The seed-bearing cones first may be separated and processed alone to release the seeds, but this procedure adds to the cost.

The procedure permits a more natural method of achieving sustainable development and maintenance of biodiversity in boreal or mixed conifer forests, in an inexpensive manner. Such mixed conifer forest may contain a variety of cone-bearing species, including black spruce, white spruce, jack pine and Douglas fir. At the rate of delimbing, the slash or cone-bearing roadside logging debris simply is comminuted to release the seeds and then the comminuted material is broadcast over the area of the strip cut or clear cut. As such, the procedure has significant economic and ecological impact on forest management.

SUMMARY OF DISCLOSURE

In summary of this disclosure, the present invention provides a novel, inexpensive procedure for achieving reforestation from materials collected during deforestation. Modifications are possible within the scope of the invention.

What we claim is:

1. A method of effecting forest management, which comprises:
    effecting a strip cut or clear cut of a mixed conifer forest in which trees are felled, transported to a delimbing site or full-tree chipping site and delimbed to form cone-bearing roadside logging debris,
    comminuting said logging debris to release live seeds from the cones, and
    broadcasting the comminuted logging debris over the area of the mixed conifer forest in which the strip cut or clear cut was made.

2. The method of claim 1 herein said mixed conifer forest contains at least one cone-bearing species selected from black spruce, white spruce, jack pine and Douglas fir.

3. The method of claim 1 wherein cones included in said logging debris first are separated therefrom prior to effecting said comminution.

4. The method of claim 1 wherein said comminution is effected by chipping or grinding the logging debris.

* * * * *